US012465550B2

(12) United States Patent
Wu

(10) Patent No.: US 12,465,550 B2
(45) Date of Patent: Nov. 11, 2025

(54) STRETCHABLE MASSAGER

(71) Applicant: Guangzhou Pinai Technology Co., Ltd., Guangzhou (CN)

(72) Inventor: Yaqin Wu, Guangzhou (CN)

(73) Assignee: Guangzhou Pinai Technology Co., Ltd., Guangzhou (CN)

( * ) Notice: Subject to any disclaimer, the term of this patent is extended or adjusted under 35 U.S.C. 154(b) by 617 days.

(21) Appl. No.: 17/881,041

(22) Filed: Aug. 4, 2022

(65) Prior Publication Data

US 2023/0201074 A1 Jun. 29, 2023

(30) Foreign Application Priority Data

Dec. 28, 2021 (CN) ........................ 202123359805.X
May 31, 2022 (CN) ........................ 202221344773.8

(51) Int. Cl.
*A61H 23/02* (2006.01)

(52) U.S. Cl.
CPC ... *A61H 23/0254* (2013.01); *A61H 2201/013* (2013.01); *A61H 2201/149* (2013.01); *A61H 2201/1692* (2013.01); *A61H 2201/5064* (2013.01)

(58) Field of Classification Search
CPC .......... A61H 23/0254; A61H 2201/013; A61H 2201/149; A61H 2201/1692; A61H 2201/5064; A61H 2201/0153; A61H 2201/0192; A61H 2201/1463; A61H 19/00; A61H 19/32; A61H 19/34; A61H 19/40; A61H 19/44; A61H 19/50
See application file for complete search history.

(56) References Cited

U.S. PATENT DOCUMENTS

| | | | | |
|---|---|---|---|---|
| 4,031,765 | A * | 6/1977 | Metz | F16H 25/122 74/57 |
| 2005/0273024 | A1* | 12/2005 | Nan | A61H 19/44 600/38 |
| 2013/0197302 | A1* | 8/2013 | Levy | A61H 23/00 600/38 |
| 2013/0261385 | A1* | 10/2013 | Zipper | A61H 23/0263 600/38 |
| 2017/0326022 | A1* | 11/2017 | Fima | A61H 19/44 |
| 2023/0151878 | A1* | 5/2023 | Yu | F16H 57/01 74/424.86 |

FOREIGN PATENT DOCUMENTS

| | | | | |
|---|---|---|---|---|
| CN | 103622805 A | * | 3/2014 | A61H 19/44 |
| JP | 2018053971 A | * | 4/2018 | F16H 25/22 |

* cited by examiner

*Primary Examiner* — Justine R Yu
*Assistant Examiner* — Matthew R Moon
(74) *Attorney, Agent, or Firm* — Westbridge IP LLC

(57) ABSTRACT

Disclosed is a stretchable massager. The stretchable massager includes an installation sleeve, a massage member and a drive member. The massage member is inserted into the installation sleeve, and a drive member is provided in the installation sleeve. A drive end of the drive member is connected to the massage member, to drive the massage member to extend or contract along a length direction of the installation sleeve.

16 Claims, 9 Drawing Sheets

STRETCHABLE MASSAGER

CROSS-REFERENCE TO RELATED APPLICATIONS

This application claims priority to Chinese Patent Application No. 202123359805.X, filed on Dec. 28, 2021, and Chinese Patent Application No. 202221344773.8, filed on May 31, 2022, the entire disclosures of which are incorporated herein by reference.

TECHNICAL FIELD

The present disclosure relates to the technical field of massage appliances, and in particular to a stretchable massager.

BACKGROUND

With the increasing pressure of people's work and life, people get tired easily. In this case, people often need a massage to relax to regulate their physical and mental health.

The current stretchable massager generally massages the user by driving the massage member to stretch. The reciprocating groove cooperates with the crescent pin to drive the stretchable massager. However, the action area of the crescent pin on the massage member is small, which may cause uneven force on the massage member, resulting in the stagnation of the massage member, and reducing the stretchable stability of the stretchable massager. Meanwhile, in actual application, different people have different massage needs, and the requirements for the stroke range of the massage member are also different. The existing stretchable massager is difficult to adjust the stroke range of the massage member, which is difficult to meet the different massage needs of users.

SUMMARY

The main purpose of the present disclosure is to provide a stretchable massager, which aims to improve the stretchable stability of the stretchable massager, and solve the problem that the existing stretchable massager is difficult to adjust the stroke range of the massage member.

In order to achieve the above objective, the present disclosure provides a stretchable massager, including an installation sleeve, a massage member inserted into the installation sleeve, and a drive member provided in the installation sleeve. A drive end of the drive member is connected to the massage member, to drive the massage member to extend or contract along a length direction of the installation sleeve.

In an embodiment, the stretchable massager further includes a position sensing member and a sensing block. The position sensing member is provided in the installation sleeve, the sensing block is provided in the connection sleeve and/or the massage member, a position of the sensing block matches a position of the position sensing member to make the position sensing member sense the position of the sensing block.

In an embodiment, the drive member includes a screw rod, a motor and a connection sleeve connected to the massage member, an outer wall of the connection sleeve is provided with a limiting plate that is abutted against an inner wall of the installation sleeve to limit the connection sleeve to rotate, the connection sleeve is sleeved on the screw rod, the screw rod is provided with a first thread extending along a length direction of the installation sleeve, an inner wall of the connection sleeve is provided with a second thread connected to the second thread, and a drive end of the motor is connected to the screw rod to drive the screw rod to rotate and drive the connection sleeve to move on the screw rod.

In an embodiment, the second thread is extended along a length direction of the connection sleeve, and an extension length of the second thread is equal to a length of the connection sleeve.

In an embodiment, the position sensing member includes a first position sensor and a second position sensor, the first position sensor and the second position sensor are sequentially provided on the inner wall of the installation sleeve along an extension direction of the massage member, the first position sensor is configured to sense a position of the massage member in a contracted state, and the second position sensor is configured to sense the position of the massage member in an extended state.

In an embodiment, the position sensing member includes a plurality of second position sensors, and the plurality of second position sensors are provided on the inner wall of the installation sleeve at intervals along the length direction of the installation sleeve.

In an embodiment, the massage member includes a movable sleeve and a massage sleeve, the movable sleeve is connected to the connection sleeve, the massage sleeve is sleeved on the movable sleeve, the massage sleeve includes a massage portion and a stretchable portion, an inner wall of the massage portion is connected to an outer wall of the movable sleeve, and the stretchable portion is configured to extend and contract along a length direction of the massage sleeve.

In an embodiment, a drive sleeve is provided in the movable sleeve, the connection sleeve is inserted into the drive sleeve, the screw rod is accommodated in the drive sleeve, the drive sleeve is provided with an abutment plate that matches a position of the limiting plate, the abutment plate is abutted against the limiting plate, and both the limiting plate and the abutment plate are provided with installation holes.

In an embodiment, the stretchable portion is provided with a stretchable pattern, and the stretchable pattern is extended along the length direction of the massage sleeve.

In an embodiment, the installation sleeve includes a hand-held portion and a massage connection portion, the massage member is provided on the massage connection portion, a control panel is provided on the hand-held portion, and the control panel is respectively electrically connected to the motor and the position sensing member.

In an embodiment, an outer wall of the massage connection portion is provided with a massage hook, the massage hook is extended in a direction away from the massage connection portion, one end of the massage hook is connected to the massage connection portion, another end of the massage hook is provided with a massage bump, a vibrating member is provided inside the massage bump, and the vibrating member is electrically connected to the control panel.

In an embodiment, a suction cup is connected to one end of the hand-held portion away from the massage connection portion, and the suction cup is detachably connected to the installation sleeve.

In an embodiment, the drive member includes a screw rod, a ball, a motor and a connection sleeve. The connection sleeve is connected to the massage member and sleeved on the screw rod. An outer wall of the connection sleeve is provided with a limiting plate that is abutted against an inner wall of the installation sleeve. The screw rod is provided with a thread groove extending along a length direction of the installation sleeve, and the ball is provided in the thread groove of the screw rod. An inner wall of the connection sleeve is provided with a limiting groove matching a position of the ball, to limit the ball to move along the length direction of the installation sleeve. The motor is connected with the screw rod to drive the screw rod to rotate, to make the ball move in the thread groove and drive the connection sleeve to move on the screw rod.

In an embodiment, the drive member comprises a plurality of balls, and the plurality of balls are sequentially provided on the screw rod along the length direction of the installation sleeve.

In an embodiment, the massage member is provided with an accommodating groove extending along the length direction of the installation sleeve, the connection sleeve is inserted into the accommodating groove of the massage member, and the screw rod is accommodated in the accommodating groove.

In an embodiment, an outer side wall of the connection sleeve is provided with an installation groove matching the position of the sensing block.

In an embodiment, the massage member is a massage rod, and the sensing block is an induced magnet.

In technical solutions of the present disclosure, the stretchable massager includes a drive member. The drive member includes a screw rod, a motor and a connection sleeve. The connection sleeve is connected to the massage member. An outer wall of the connection sleeve is provided with a limiting plate that is abutted against an inner wall of the installation sleeve to limit the connection sleeve to rotate. The connection sleeve is sleeved on the screw rod. The screw rod is provided with a first thread extending along a length direction of the installation sleeve, an inner wall of the connection sleeve is provided with a second thread, and the first thread is connected to the second thread. A drive end of the motor is connected to the screw rod to drive the screw rod to rotate and drive the connection sleeve to move on the screw rod. Thus, the stretch of the massage member is realized. Since the second thread in the connection sleeve is connected to the first thread on the screw rod, compared with the connection method using the ball, the second thread with the corresponding size can be set according to the specific size of the connection sleeve, and the inner wall of the connection sleeve is filled with the second thread. Thus, the connection sleeve is evenly stressed, to improve the stability of the movement of the massage member, and finally improve the stretchable stability of the stretchable massager.

Meanwhile, the position sensing member is provided on the installation sleeve, the sensing block is provided on the drive end of the drive member and/or the massage member, and the position of the sensing block matches the position of the position sensing member, so that the position sensing member can sense the position of the sensing block. Since the sensing block moves with the drive end of the drive member and/or the massage member, that is, the position sensing member can sense the drive end of the drive member and/or the position of the massage member, so that the user can control the movement of the massage member by controlling the drive member. Therefore, the stroke range of the massage member can be adjusted to meet the different usage demands of users.

BRIEF DESCRIPTION OF THE DRAWINGS

In order to more clearly illustrate the technical solutions in the embodiments of the present disclosure or in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

Figure 1:
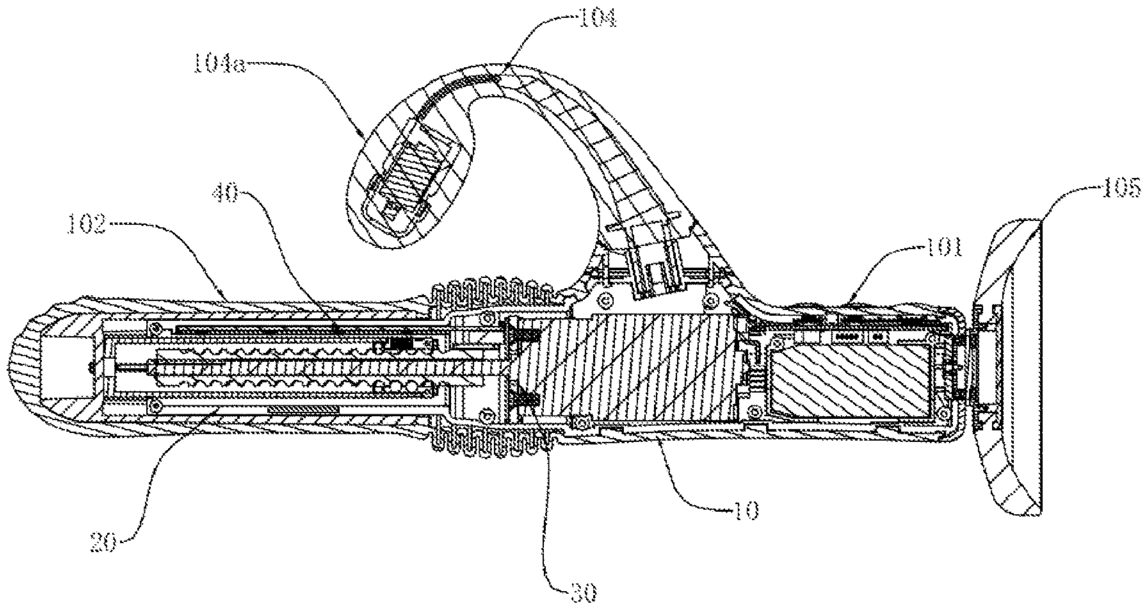
FIG. 1 is a schematic structural view of a stretchable massager according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture. If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. The meaning of "and/or" appearing in the disclosure includes three parallel scenarios. For example, "A and/or B" includes only A, or only B, or both A and B. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a stretchable massager.

In an embodiment of the present disclosure, as shown in FIG. 1 to FIG. 3 and FIG. 6 to FIG. 8, the stretchable massager includes an installation sleeve 10, a massage member 20 inserted into the installation sleeve 10 and a drive member 30 provided in the installation sleeve 10. A drive end of the drive member 30 is connected to the massage member 20, to drive the massage member 20 to extend or contract along a length direction of the installation sleeve 10.

The drive member 30 includes a screw rod 301, a motor 302 and a connection sleeve 303. The connection sleeve 303 is connected to the massage member 20. An outer wall of the connection sleeve 303 is provided with a limiting plate 303*a* that is abutted against an inner wall of the installation sleeve 10 to limit the connection sleeve 303 to rotate. The connection sleeve 303 is sleeved on the screw rod 301. The screw rod 301 is provided with a first thread 301*a* extending along a length direction of the installation sleeve 10, an inner wall of the connection sleeve 303 is provided with a second thread 303*b*, and the first thread 301*a* is connected to the second thread 303*b*. A drive end of the motor 302 is connected to the screw rod 301 to drive the screw rod 301 to rotate and drive the connection sleeve 303 to move on the screw rod 301.

In technical solutions of the present disclosure, the stretchable massager includes a drive member 30. The drive member 30 includes a screw rod 301, a motor 302 and a connection sleeve 303. The connection sleeve 303 is connected to the massage member 20. An outer wall of the connection sleeve 303 is provided with a limiting plate 303*a* that is abutted against an inner wall of the installation sleeve 10 to limit the connection sleeve 303 to rotate. The connection sleeve 303 is sleeved on the screw rod 301. The screw rod 301 is provided with a first thread 301*a* extending along a length direction of the installation sleeve 10, an inner wall of the connection sleeve 303 is provided with a second thread 303*b*, and the first thread 301*a* is connected to the second thread 303*b*. A drive end of the motor 302 is connected to the screw rod 301 to drive the screw rod 301 to rotate and drive the connection sleeve 303 to move on the screw rod 301. Thus, the expansion and contraction of the massage member 20 is realized. Since the second thread 303*b* in the connection sleeve 303 is connected to the first thread 301*a* on the screw rod 301, compared with the connection method using the ball, the second thread 303*b* with the corresponding size can be set according to the specific size of the connection sleeve 303, and the inner wall of the connection sleeve 303 is filled with the second thread 303*b*. Thus, the connection sleeve 303 is evenly stressed, to improve the stability of the movement of the massage member 20, and finally improve the stretchable stability of the stretchable massager.

Figure 3:
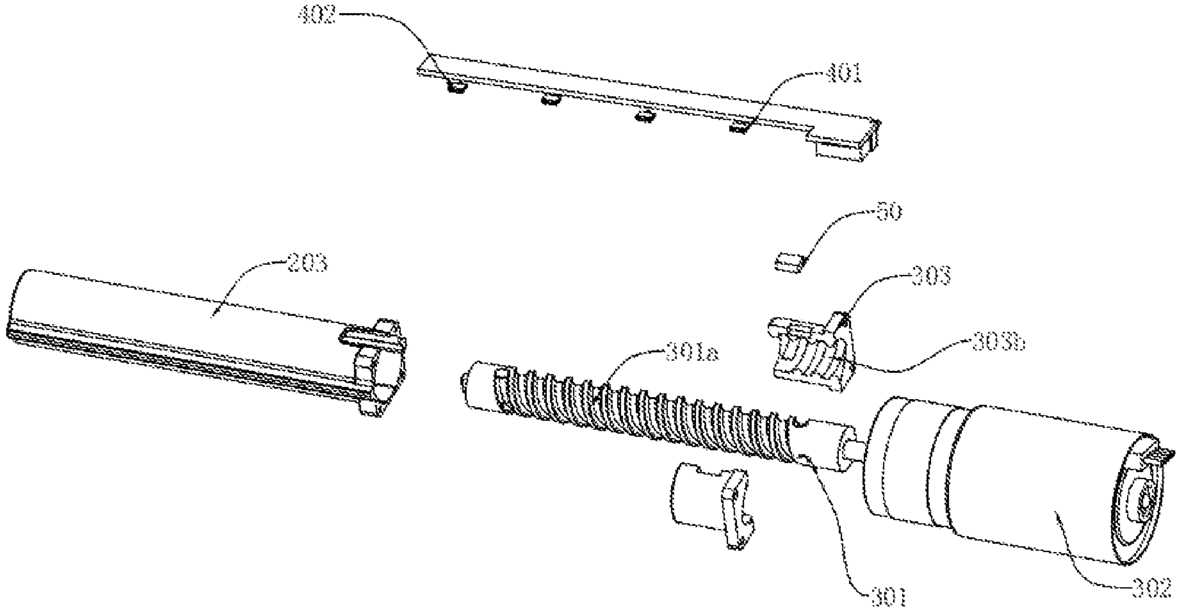
FIG. 3 is a schematic view of an internal structure of the stretchable massager according to an embodiment of the present disclosure.

As shown in FIG. 3, the second thread 303*b* extends along a length direction of the connection sleeve 303, and an extension length of the second thread 303*b* is equal to a length of the connection sleeve 303. The inner wall of the connection sleeve 303 can be filled with the second thread 303*b*, which can ensure that the connection sleeve 303 is evenly stressed, and further improves the stretchable stability of the stretchable massager.

As shown in FIG. 3, the stretchable massager further includes a position sensing member 40 and a sensing block 50. The position sensing member 40 is provided in the installation sleeve 10. The sensing block 50 is provided in the connection sleeve 303 and/or the massage member 20. The sensing block 50 matches a position of the position sensing member 40 to make the position sensing member 40 sense a position of the sensing block 5.

Figure 7:
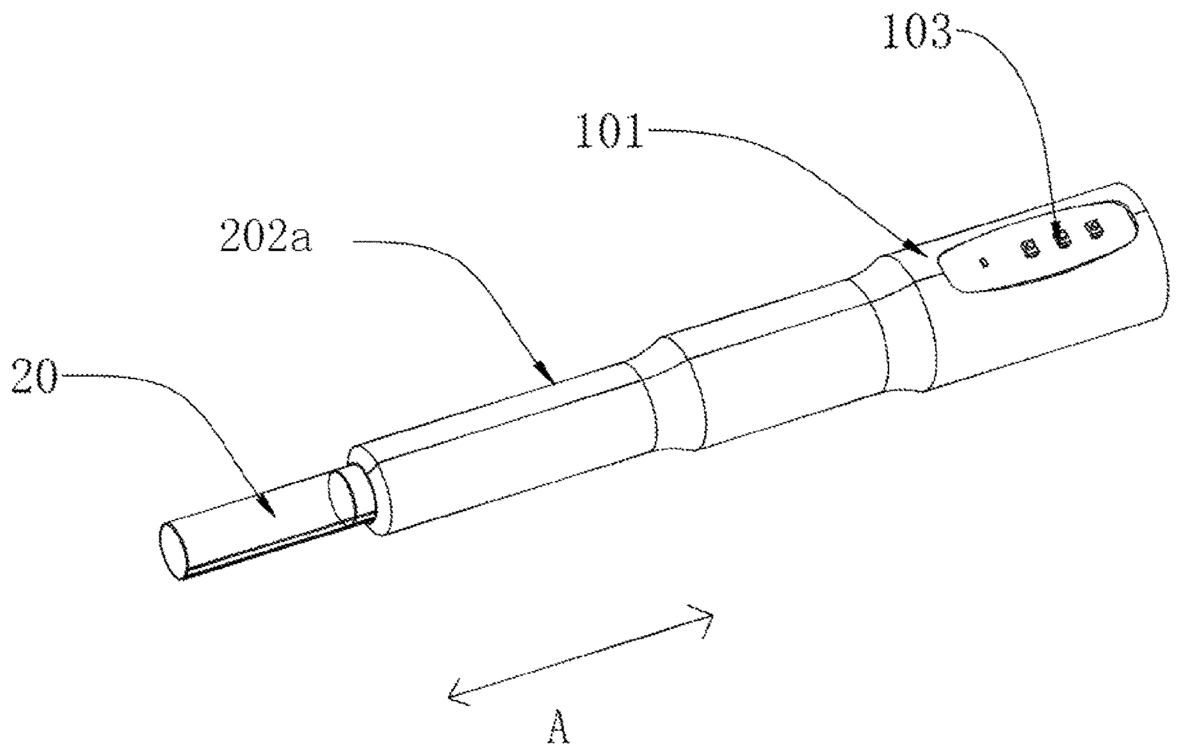
FIG. 7 is a schematic structural view of the massage member of the stretchable massager in an extended state according to an embodiment of the present disclosure.

The length direction of the installation sleeve 10 is the direction shown at portion A in FIG. 7.

In technical solutions of the present disclosure, the position sensing member 40 is provided on the installation sleeve 10, the sensing block 50 is provided on the drive end of the drive member 30 and/or the massage member 20, and the position of the sensing block 50 matches the position of the position sensing member 40, so that the position sensing member 40 can sense the position of the sensing block 50. Since the sensing block 50 moves with the drive end of the drive member 30 and/or the massage member 20, that is, the position sensing member 40 can sense the drive end of the drive member 30 and/or the position of the massage member 20, so that the user can control the movement of the massage member 20 by controlling the drive member 30. Therefore, the stroke range of the massage member 20 can be adjusted to meet the different usage demands of users.

Figure 9:
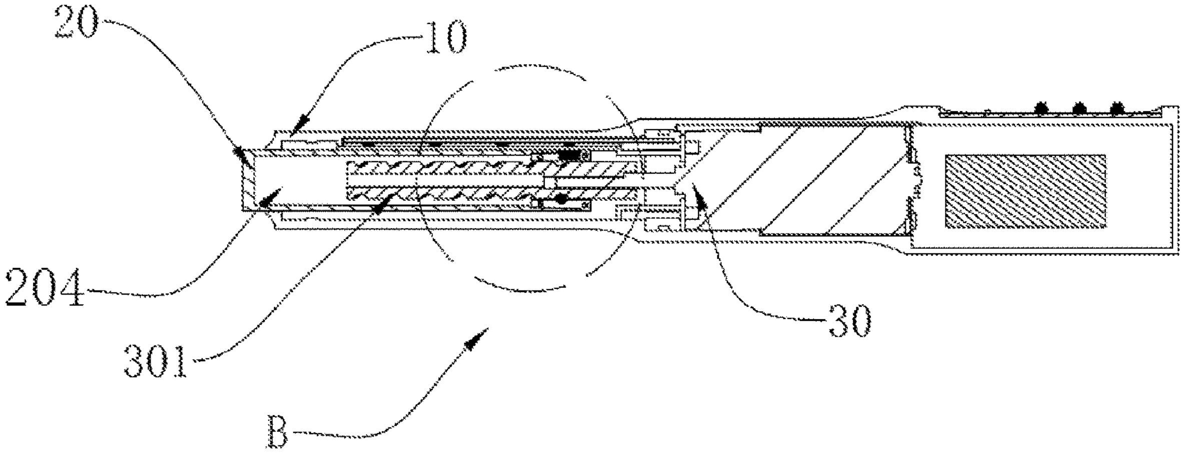
FIG. 9 is a schematic cross-sectional view of the massage member of the stretchable massager in a contracted state according to an embodiment of the present disclosure.
Figure 10:
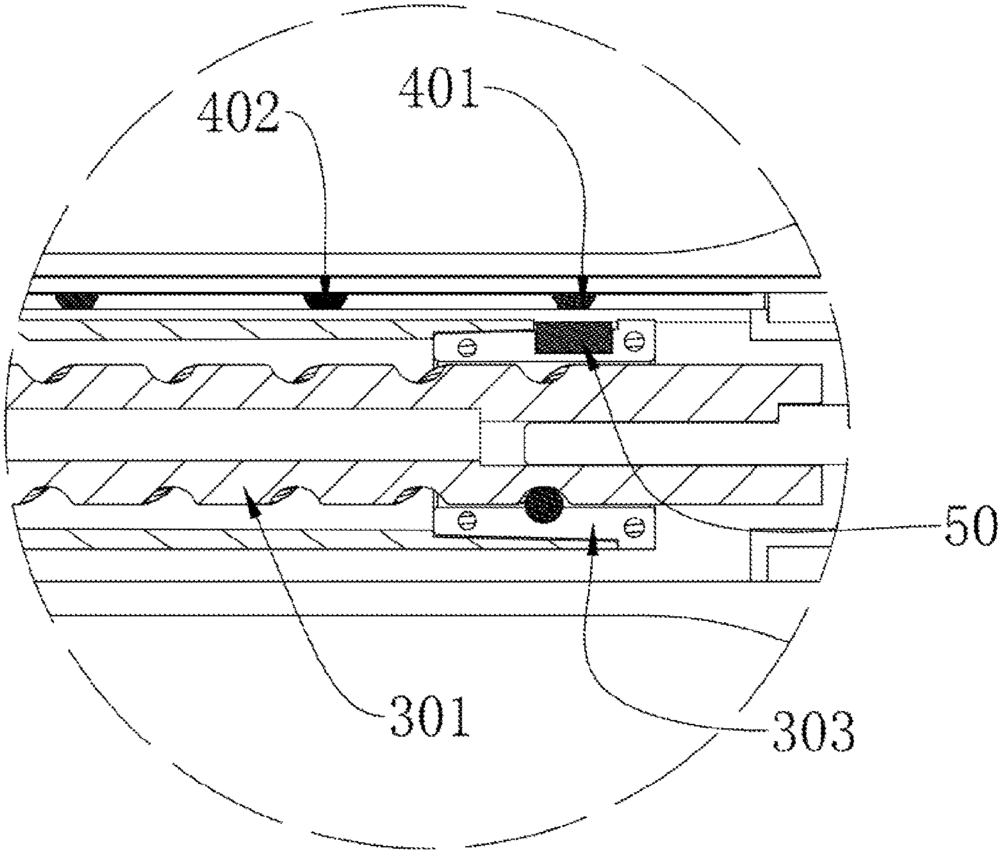
FIG. 10 is a partial enlarged view of portion B in FIG. 9.
Figure 11:
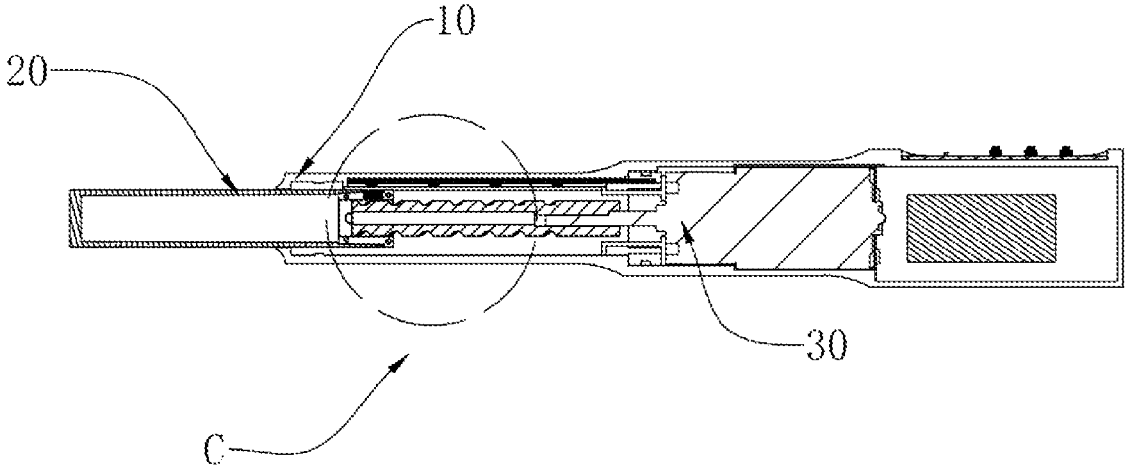
FIG. 11 is a schematic cross-sectional view of the massage member of the stretchable massager in an extended state according to an embodiment of the present disclosure.

As shown in FIG. 9 to FIG. 11, the position sensing member 40 includes a first position sensor 401 and a second position sensor 402. The first position sensor 401 and the second position sensor 402 are sequentially provided on the inner wall of the installation sleeve 10 along an extension direction of the massage member 20. The first position sensor 401 is configured to sense a position of the massage member 20 in a contracted state, and the second position sensor 402 is configured to sense the position of the massage member 20 in an extended state. Since the first position sensor 401 and the second position sensor 402 are sequentially provided on the inner wall of the installation sleeve 10 along the extension direction of the massage member 20, and the sensing block 50 is provided on the drive end of the drive member 30 and/or the massage member 20, and the first position sensor 401 can sense the position of the massage member 20 in the contracted state. That is, the first position sensor 401 can sense the initial position of the massage member 20, and the second position sensor 402 can sense the position of the massage member 20 after the massage member is extended. A distance between the first position sensor 401 and the second position sensor 402 is an extension stroke of the massage member 20. The first position sensor 401 and the second position sensor 402 are provided at the corresponding positions, and the stroke range of the massage member 20 can be adjusted. Both the first position sensor 401 and the second position sensor 402 are Hall sensors, and the Hall sensor is a magnetic field sensor.

Figure 12:
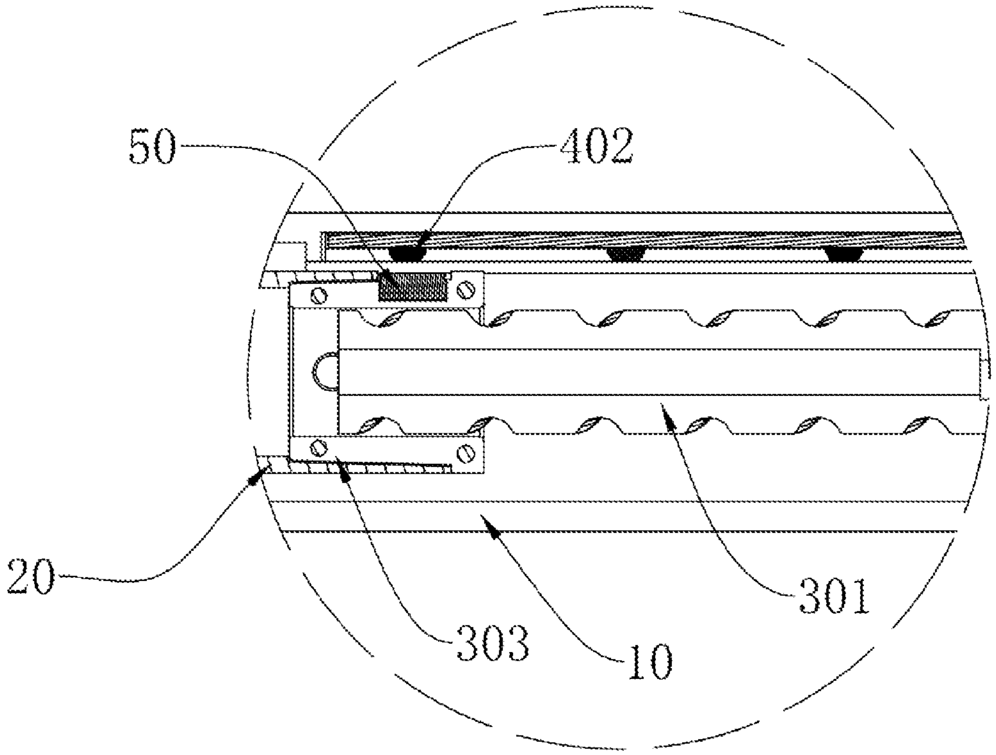
FIG. 12 is a partial enlarged view of portion C in FIG. 11.

As shown in FIG. 3, FIG. 10 and FIG. 12, the position sensing member includes a plurality of second position sensors 402, and the plurality of second position sensors 402 are provided on the inner wall of the installation sleeve 10 at intervals along the length direction of the installation sleeve 10. The distances between each of the second position sensors 402 and the first position sensor 401 are different. That is to say, various stroke ranges of different massage members 20 are available. According to the length of the distance between the first position sensor 401 and the second position sensors 402 at different positions, the high gear and the low gear can be respectively set to meet different usage requirements of users.

Figure 2:
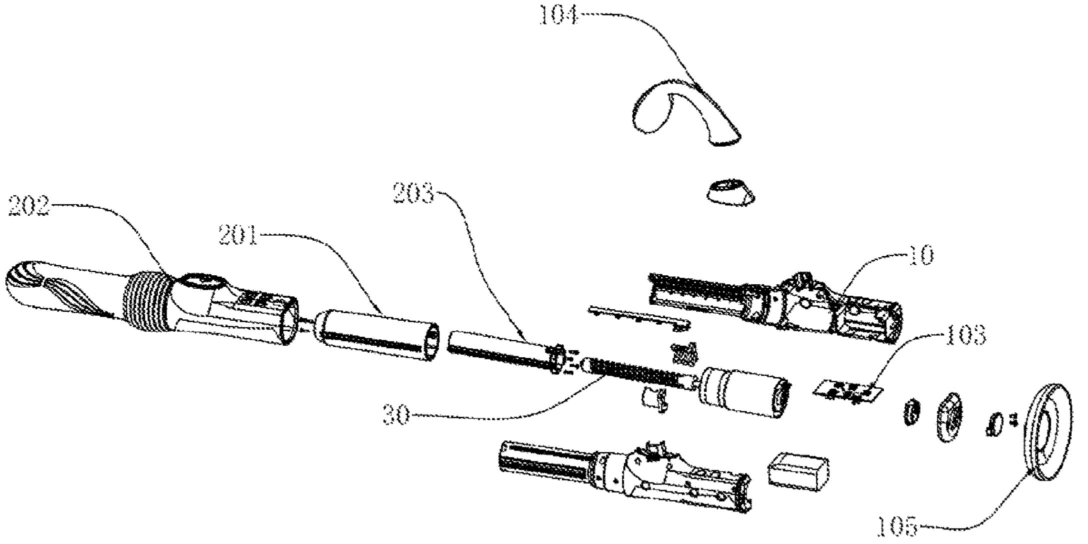
FIG. 2 is an exploded schematic structural view of the stretchable massager according to an embodiment of the present disclosure.
Figure 5:
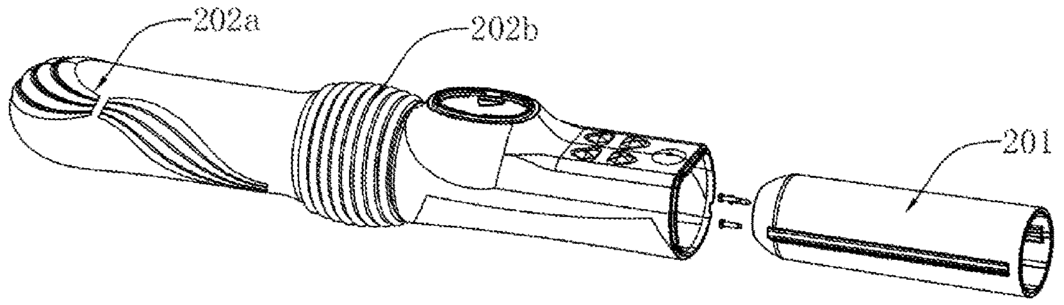
FIG. 5 is a schematic structural view of a massage sleeve and a movable sleeve of the stretchable massager according to an embodiment of the present disclosure.
Figure 6:
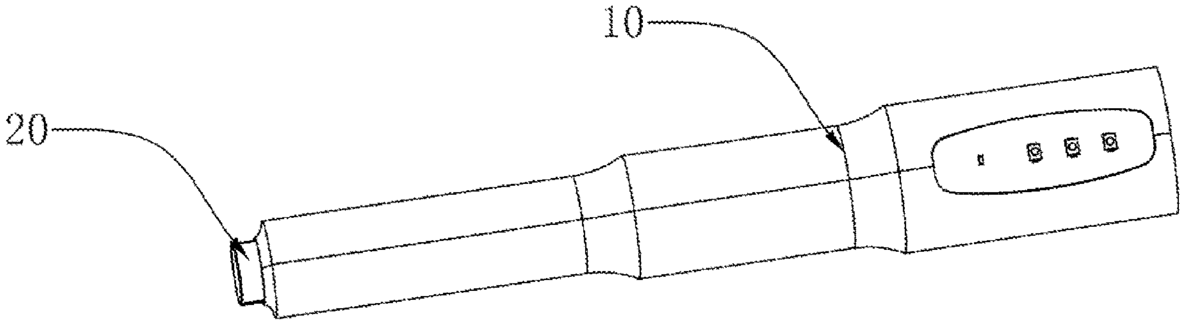
FIG. 6 is a schematic structural view of a massage member of the stretchable massager in a contracted state according to an embodiment of the present disclosure.

As shown in FIG. 2 and FIG. 5, the massage member 20 includes a movable sleeve 201 and a massage sleeve 202. The movable sleeve 201 is connected to the connection sleeve 303. The massage sleeve 202 is sleeved on the movable sleeve 201. The massage sleeve 202 includes a massage portion **202*a* and a stretchable portion 202*b*. An inner wall of the massage portion 202*a* is connected to an outer wall of the movable sleeve 201. The stretchable portion 202*b* is configured to extend and contract along a length direction of the massage sleeve 202. Since the movable sleeve 201 is connected to the connection sleeve 303, when the motor 302 drives the screw rod 301 to rotate, the movable sleeve 201 can be driven to move, the inner wall of the massage portion 202*a* of the massage sleeve 202 is connected to the outer wall of the movable sleeve 201, and the stretchable portion 202*b* can be stretched along the length direction of the massage sleeve 202. Further, the massage portion 202*a* of the massage sleeve 202** can be stretched to massage the user, the structure is simple, and the use is convenient.

The stretchable portion **202*b* is provided with a stretchable pattern, and the stretchable pattern extends along the length direction of the massage sleeve 202. The massage sleeve 202** is made of elastic material, and the stretchable pattern is a folded structure, which can be quickly stretched, thereby improving the response speed of the stretchable massager.

Figure 4:
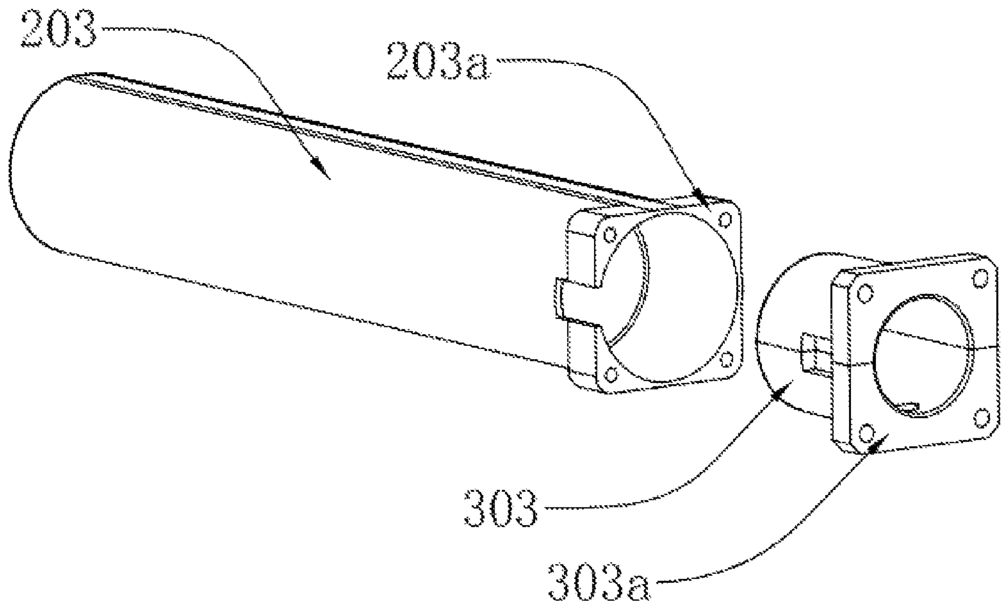
FIG. 4 is a schematic structural view of a drive sleeve and a connection sleeve of the stretchable massager according to an embodiment of the present disclosure.

As shown in FIG. 2, FIG. 3 and FIG. 4, a drive sleeve 203 is provided in the movable sleeve 201. The connection sleeve 303 is inserted into the drive sleeve 203, the screw rod 301 is accommodated in the drive sleeve 203. During the contraction of the massage member 20, the screw rod 301 can be accommodated in the drive sleeve 203, which can make the structure of the stretchable massager more compact and improve the portability of the stretchable massager. The drive sleeve 203 is provided with an abutment plate **203*a* that matches a position of the limiting plate 303*a*, the abutment plate 203*a* abuts against the limiting plate 303*a*, and both the limiting plate 303*a* and the abutment plate 203*a* are provided with installation holes. When the connection sleeve 303 is installed to the drive sleeve 203, it is only necessary to align the installation holes of the limiting plate 303*a* with the installation holes of the abutment plate 203*a*, then screw on the corresponding fasteners, such that the connection sleeve 303 can be connected to the drive sleeve 203**, the operation is simple, and the installation efficiency of the stretchable massager can be improved.

As shown in FIG. 1 to FIG. 3 and FIG. 7 to FIG. 8, the installation sleeve 10 includes a hand-held portion 101 and a massage connection portion 102. The massage member 20 is provided on the massage connection portion 102. A control panel 103 is provided on the hand-held portion 101, and the control panel 103 is respectively electrically connected to the motor 302 and the position sensing member 40. The position sensing member 40 can transmit the corresponding position signal to the control panel 103. The user can control the stroke of the massage member 20 through the control panel 103, or remotely control the control panel 103 through the terminal device to control the stretchable state of the massage member 20. Since the control panel 103 is provided on the hand-held portion 101, it is convenient for the user to directly operate the control panel 103 by hand.

As shown in FIG. 1 and FIG. 2, an outer wall of the massage connection portion 102 is provided with a massage hook 104. The massage hook 104 is generally made of silicone material. The massage hook 104 extends in a direction away from the massage connection portion 102. One end of the massage hook 104 is connected to the massage connection portion 102. Another end of the massage hook 104 is provided with a massage bump **104*a*. A vibrating member is provided inside the massage bump 104*a*, and the vibrating member is electrically connected to the control panel 103. When massaging, the massage bump is aligned at the body part that needs to be massaged, and then the vibrating member is activated through the control panel 103 to massage the body part. The massage bump 104*a* is combined with the massage member 20, which can massage two different body parts at the same time. For example, the massage member 20 is used for massaging the inside of the body, and the massage bumps 104*a*** are used for massaging the outside of the body, which improves the massage effect of the stretchable massager.

As shown in FIG. 1 and FIG. 2, a suction cup 105 is connected to one end of the hand-held portion 101 away from the massage connection portion 102. When the user feels tired, the suction cup 105 can be adsorbed to the ground or the wall to fix the stretchable massager, and then the user is massaged, to improve the use convenience of the stretchable massager. In addition, the suction cup can be detachably connected to the installation sleeve, that is, the suction cup and the installation sleeve can be connected by threads, snap grooves, or the like. These connection methods are conventional technical means, and will not be repeated herein. When the suction cup is not needed, the suction cup can be quickly disassembled to reduce the weight and volume of the stretchable massager, and improve the portability of the stretchable massager.

Figure 8:
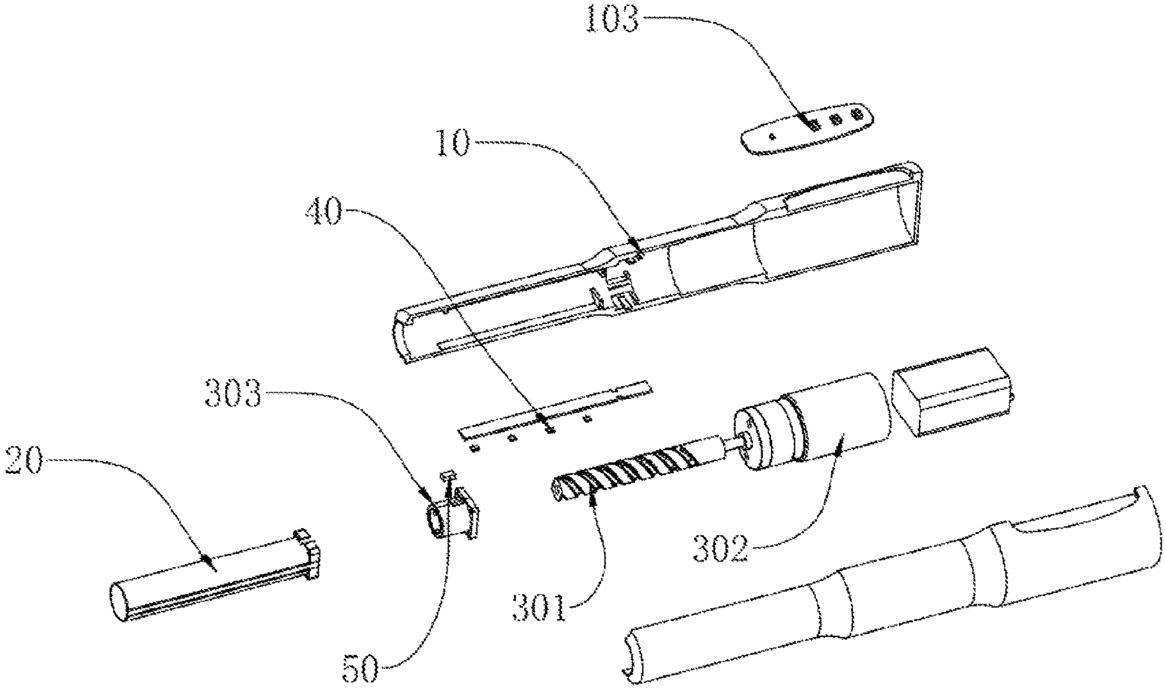
FIG. 8 is an exploded schematic structural view of the stretchable massager according to an embodiment of the present disclosure.
Figure 15:
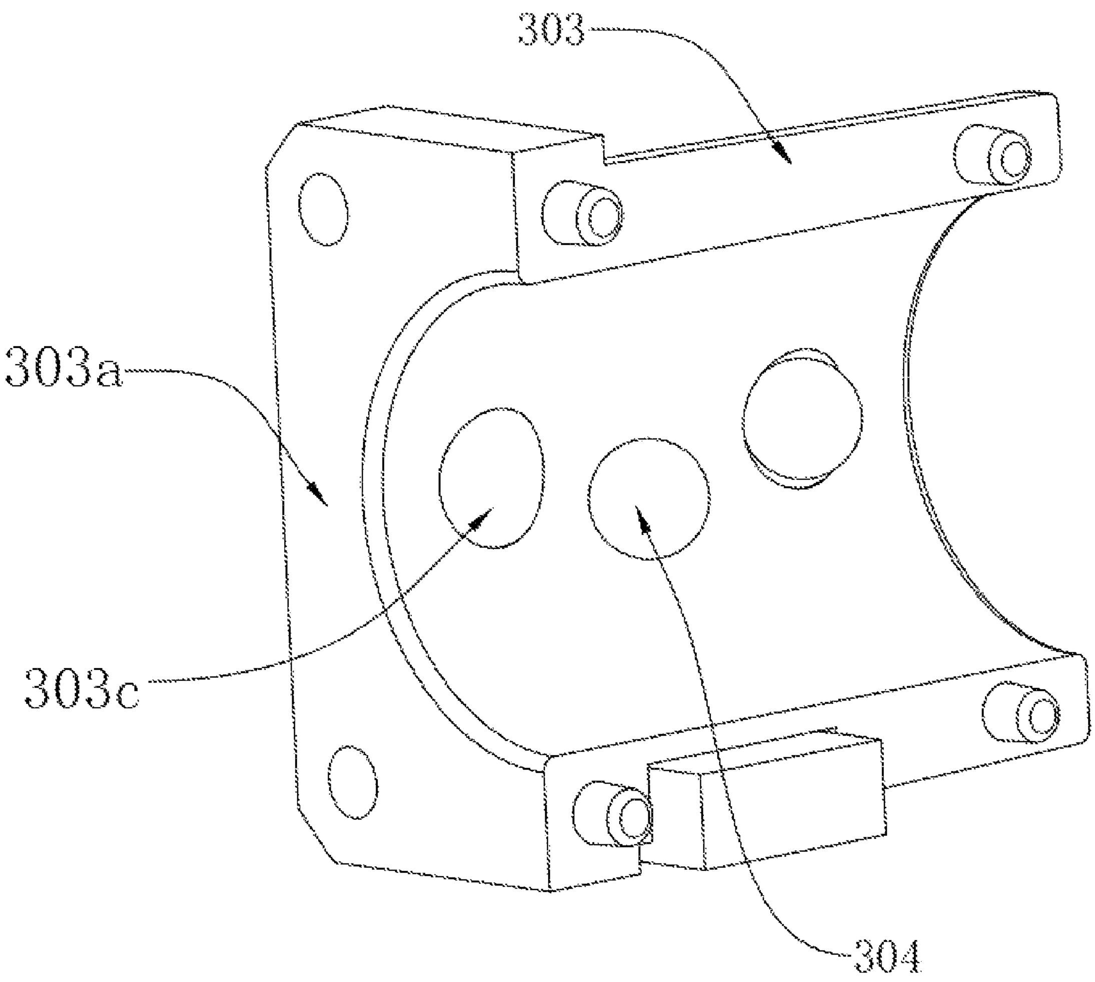
FIG. 15 is a schematic structural view of an inner wall of the connection sleeve of the stretchable massager according to an embodiment of the present disclosure.
Figure 16:
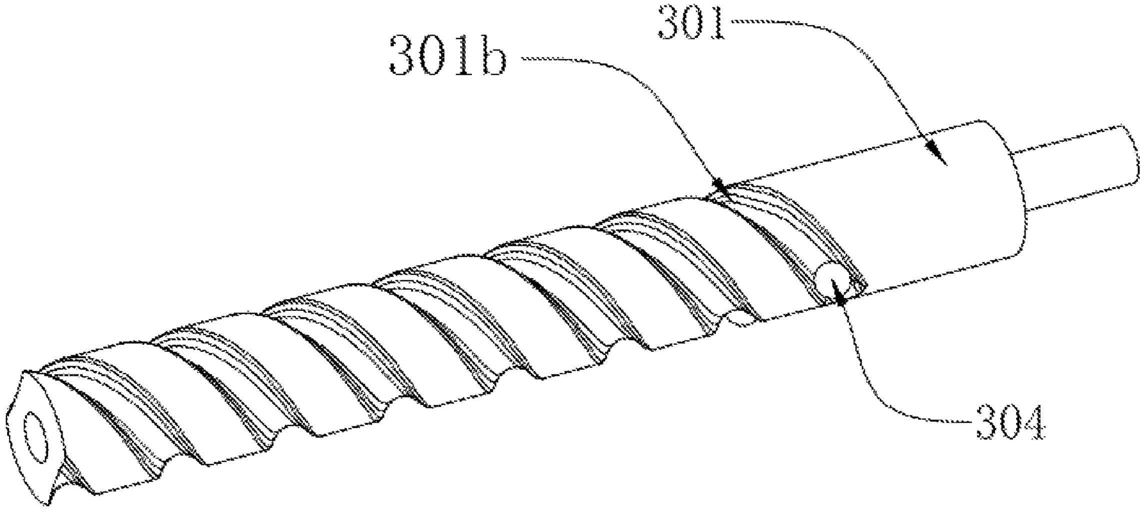
FIG. 16 is a schematic structural view of a screw rod of the stretchable massager according to an embodiment of the present disclosure.

As shown in FIG. 8, FIG. 15 and FIG. 16, the drive member 30 is located in the installation sleeve 10. The drive member 30 includes a screw rod 301, a ball 304, a motor 302 and a connection sleeve 303. The connection sleeve 303 is connected to the massage member 20 and sleeved on the screw rod 301. An outer wall of the connection sleeve 303 is provided with a limiting plate **303*a* that is abutted against an inner wall of the installation sleeve 10. The screw rod 301 is provided with a thread groove 301*b* extending along a length direction of the installation sleeve 10. The ball 304 is provided in the thread groove 301*b* of the screw rod 301. An inner wall of the connection sleeve 303 is provided with a limiting groove 303*c* matching a position of the ball 304, to limit the ball 304 to move along the length direction of the installation sleeve 10. The motor 302 is connected with the screw rod 301 to drive the screw rod 301 to rotate, to make the ball 304 move in the thread groove 301*b* and drive the connection sleeve 303 to move on the screw rod 301. When the massage member 20 needs to be driven by the drive member 30 to extend or contract, the motor 302 can drive the screw rod 301 to rotate forward or reversely, so that the ball 304 moves in the thread groove 301***b* of the screw rod 301. In addition, since the inner wall of the connection sleeve 303 is provided with a limiting groove 303*c* matching the position of the ball 304, and the outer wall of the connection sleeve 303 is provided with a limiting plate 303*a* that abuts against the inner wall of the installation sleeve 10, that is, the connection sleeve 303 cannot rotate, and the ball 304 can only move along the length direction of the installation sleeve 10, which drives the connection sleeve 303 to move along the length direction of the installation sleeve 10. The forward or reverse rotation of the motor 302 can make the massage member 20 extend or contract.

The drive member 30 includes a plurality of balls 304, and the plurality of balls 304 are sequentially provided on the screw rod 301 along the length direction of the installation sleeve 10. Since the screw rod 301 drives the balls 304 to move and pushes the connection sleeve 303 to move, the number of the balls 304 affects the force required by the screw rod 301 to push the connection sleeve 303. The number of balls 304 can be set according to actual needs. In addition, the connection sleeve 303 needs to be provided with a corresponding number of limiting grooves 303*c* to limit the positions of the plurality of balls 304.

Figure 13:
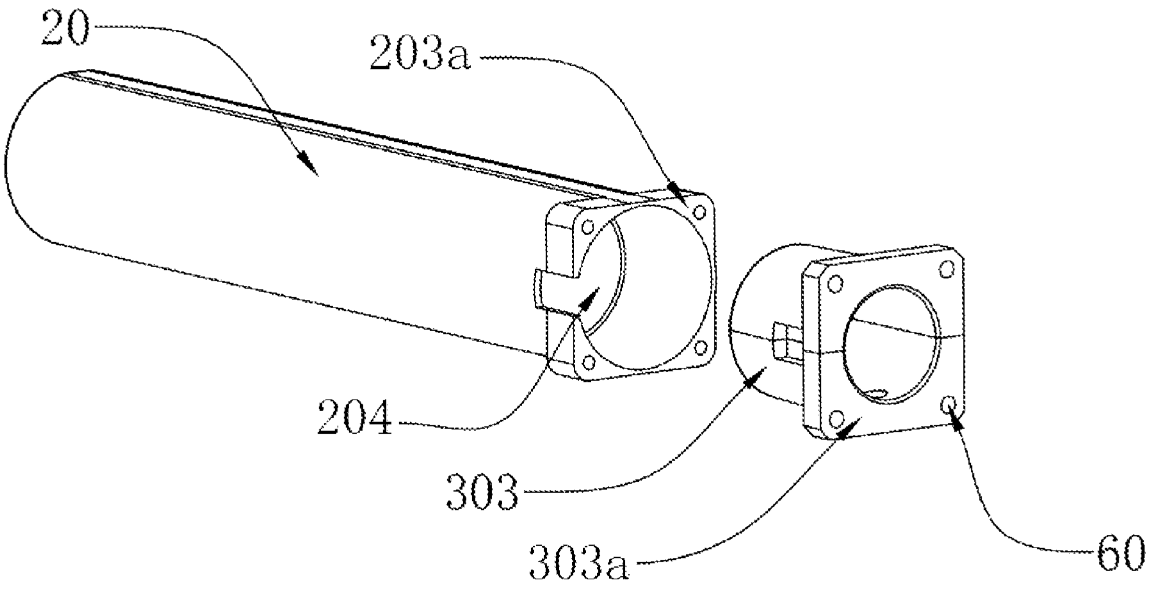
FIG. 13 is a schematic structural view of the massage member and the connection sleeve of the stretchable massager according to an embodiment of the present disclosure.

As shown in FIG. 13, the massage member 20 is provided with an accommodating groove 204 extending along the length direction of the installation sleeve 10, the connection sleeve 303 is inserted into the accommodating groove 204 of the massage member 20, and the screw rod 301 is accommodated in the accommodating groove 204. During the contraction of the massage member 20, the screw rod 301 can be accommodated in the accommodating groove 204, which can make the structure of the stretchable massager more compact and improve the portability of the stretchable massager.

As shown in FIG. 13, the massage member 20 is provided with an abutment plate 203*a* matching the position of the limiting plate 303*a*. The abutment plate 203*a* abuts against the limiting plate 303*a*. Both the limiting plate 303*a* and the abutment plate 203*a* are provided with installation holes 60. The abutment plate 203*a* and the limiting plate 303*a* can be connected by screws. When the motor 302 drives the screw rod 301 to rotate, and the screw rod 301 drives the connection sleeve 303 to move, since the abutment plate 203*a* abuts against the limiting plate 303*a*, the connection sleeve 303 can push the massage member 20, so that the drive member 30 can control the state of the massage member 20.

Figure 14:
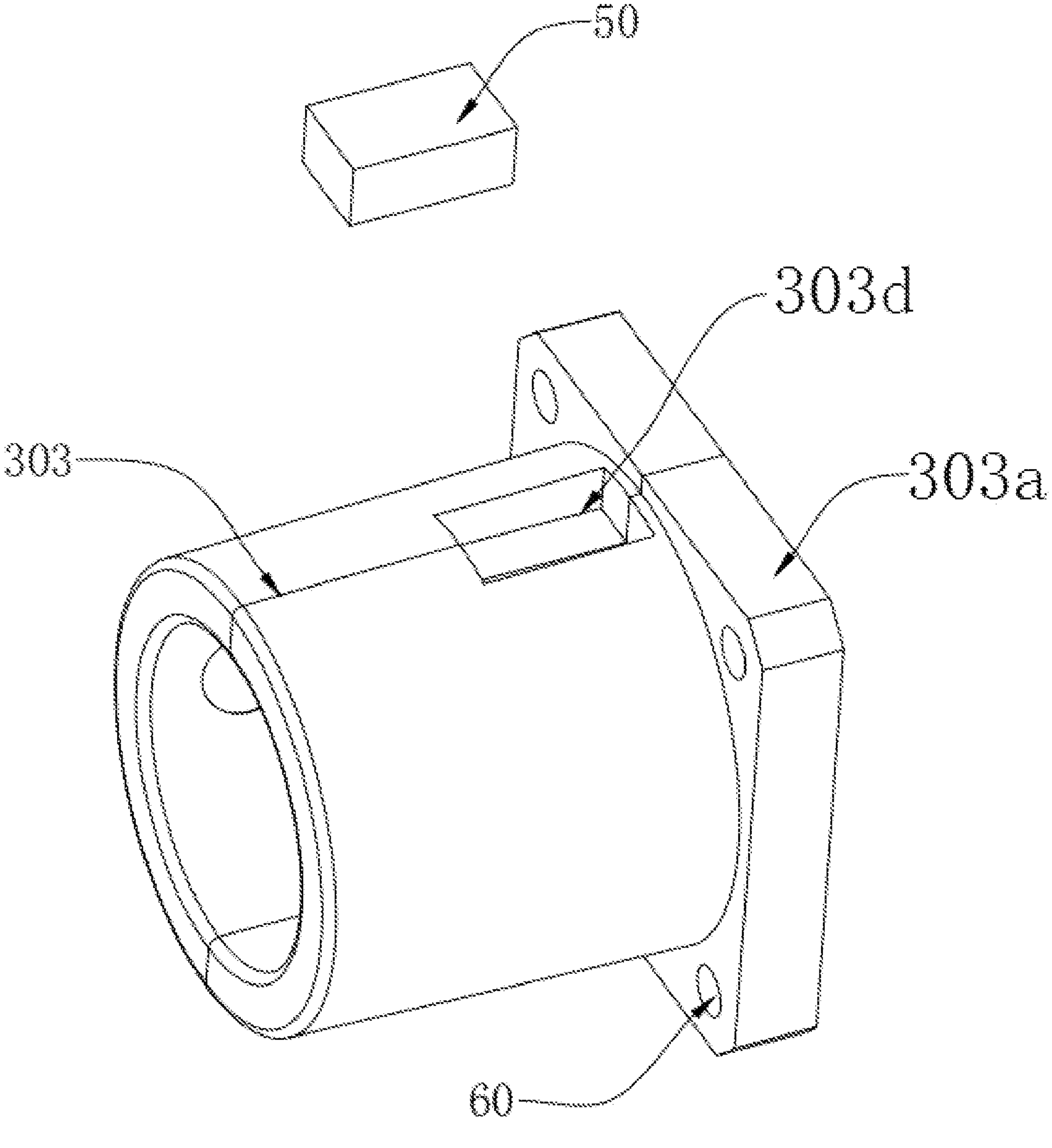
FIG. 14 is a schematic structural view of the connection sleeve of the stretchable massager according to an embodiment of the present disclosure.

As shown in FIG. 14, the connection sleeve 303 is provided with an installation groove 303*d* matching the position of the sensing block 50. When the sensing block 50 needs to be installed in the connection sleeve 303, the sensing block 50 can be directly snapped into the installation groove 303*d*. Since the massage member 20 is connected with the connection sleeve 303, the stroke of the connection sleeve 303 is equal to the stroke of the massage member 20, which is convenient for the position sensing member 40 to detect the position of the massage member 20.

As shown in FIG. 7, when the massage member 20 is a massage rod, the massage effect of the massage rod is better, which can improve the massage performance of the stretchable massager. The sensing block 50 is an induced magnet, and the induced magnet is easy to be sensed by the position sensing element 40, which can improve the induction efficiency of the position sensing element 40.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A stretchable massager, comprising:
- an installation sleeve;
- a massage member inserted into the installation sleeve; and
- a drive member provided in the installation sleeve,
- wherein a drive end of the drive member is connected to the massage member, to drive the massage member to extend or contract along a length direction of the installation sleeve;
- the drive member comprises a screw rod, a motor, and a connection sleeve connected to the massage member;
- an outer wall of the connection sleeve is provided with a limiting plate;
- the massage member comprises a movable sleeve connected to the connection sleeve;
- a drive sleeve is provided in the movable sleeve, the connection sleeve is inserted into the drive sleeve, the screw rod is accommodated in the drive sleeve;
- the drive sleeve is provided with an abutment plate matching a position of the limiting plate, the abutment plate including front and back surfaces and the limiting plate including front and back surfaces, wherein the back surface of the abutment plate is abutted against the front surface of the limiting plate, and both the limiting plate and the abutment plate are provided with installation holes; and
- the drive sleeve and the connection sleeve are connected by fasteners.

2. The stretchable massager of claim 1, further comprising:
- a position sensing member; and
- a sensing block,
- wherein the position sensing member is provided in the installation sleeve, the sensing block is provided in the connection sleeve and/or the massage member, a position of the sensing block is matched with a position of the position sensing member to make the position sensing member sense the position of the sensing block.

3. The stretchable massager of claim 2, wherein:
- the limiting plate is abutted against an inner wall of the installation sleeve to limit the connection sleeve to rotate;
- the connection sleeve is sleeved on the screw rod, the screw rod is provided with a first thread extending along a length direction of the installation sleeve;
- an inner wall of the connection sleeve is provided with a second thread connected to the first thread; and
- a drive end of the motor is connected to the screw rod to drive the screw rod to rotate and drive the connection sleeve to move on the screw rod.

4. The stretchable massager of claim 3, wherein the second thread is extended along a length direction of the connection sleeve, and an extension length of the second thread is equal to a length of the connection sleeve.

5. The stretchable massager of claim 3, wherein:
- the installation sleeve comprises a hand-held portion and a massage connection portion;
- the massage member is provided on the massage connection portion; and a control panel is provided on the hand-held portion, and the control panel is electrically connected to the motor and the position sensing member.

6. The stretchable massager of claim 5, wherein:

an outer wall of the massage connection portion is provided with a massage hook, the massage hook is extended in a direction away from the massage connection portion;

one end of the massage hook is connected to the massage connection portion, another end of the massage hook is provided with a massage bump; and a vibrating member is provided inside the massage bump, and the vibrating member is electrically connected to the control panel.

7. The stretchable massager of claim 5, wherein a suction cup is connected to one end of the hand-held portion away from the massage connection portion, and the suction cup is detachably connected to the installation sleeve.

8. The stretchable massager of claim 2, wherein:

the position sensing member comprises a first position sensor and a second position sensor;

the first position sensor and the second position sensor are sequentially provided on the inner wall of the installation sleeve along an extension direction of the massage member; and the first position sensor is configured to sense a position of the massage member in a contracted state, and the second position sensor is configured to sense the position of the massage member in an extended state.

9. The stretchable massager of claim 8, wherein the position sensing member comprises a plurality of second position sensors, and the plurality of second position sensors are provided on the inner wall of the installation sleeve at intervals along the length direction of the installation sleeve.

10. The stretchable massager of claim 2, wherein the drive member further comprises a ball; the connection sleeve is sleeved on the screw rod; the limiting plate is abutted against an inner wall of the installation sleeve;

the screw rod is provided with a thread groove extending along a length direction of the installation sleeve, the ball is provided in the thread groove of the screw rod;

an inner wall of the connection sleeve is provided with a limiting groove matching a position of the ball, to limit the ball to move along the length direction of the installation sleeve; and the motor is connected with the screw rod to drive the screw rod to rotate, to make the ball move in the thread groove and drive the connection sleeve to move on the screw rod.

11. The stretchable massager of claim 10, wherein the drive member comprises a plurality of balls, and the plurality of balls are sequentially provided on the screw rod along the length direction of the installation sleeve.

12. The stretchable massager of claim 10, wherein the massage member is provided with an accommodating groove extending along the length direction of the installation sleeve, the connection sleeve is inserted into the accommodating groove of the massage member, and the screw rod is accommodated in the accommodating groove.

13. The stretchable massager of claim 10, wherein an outer side wall of the connection sleeve is provided with an installation groove matching the position of the sensing block.

14. The stretchable massager of claim 2, wherein the massage member is a massage rod, and the sensing block is an induced magnet.

15. The stretchable massager of claim 1, wherein:

the massage member further comprises a massage sleeve sleeved on the movable sleeve;

the massage sleeve comprises a massage portion and a stretchable portion;

an inner wall of the massage portion is connected to an outer wall of the movable sleeve; and the stretchable portion is configured to extend and contract along a length direction of the massage sleeve.

16. The stretchable massager of claim 15, wherein the stretchable portion is provided with a stretchable pattern, and the stretchable pattern is extended along the length direction of the massage sleeve.

* * * * *